C. C. BIGGERSTAFF.
SEED COTTON CLEANER.
APPLICATION FILED MAY 22, 1920.
1,395,382.
Patented Nov. 1, 1921.
2 SHEETS—SHEET 1.
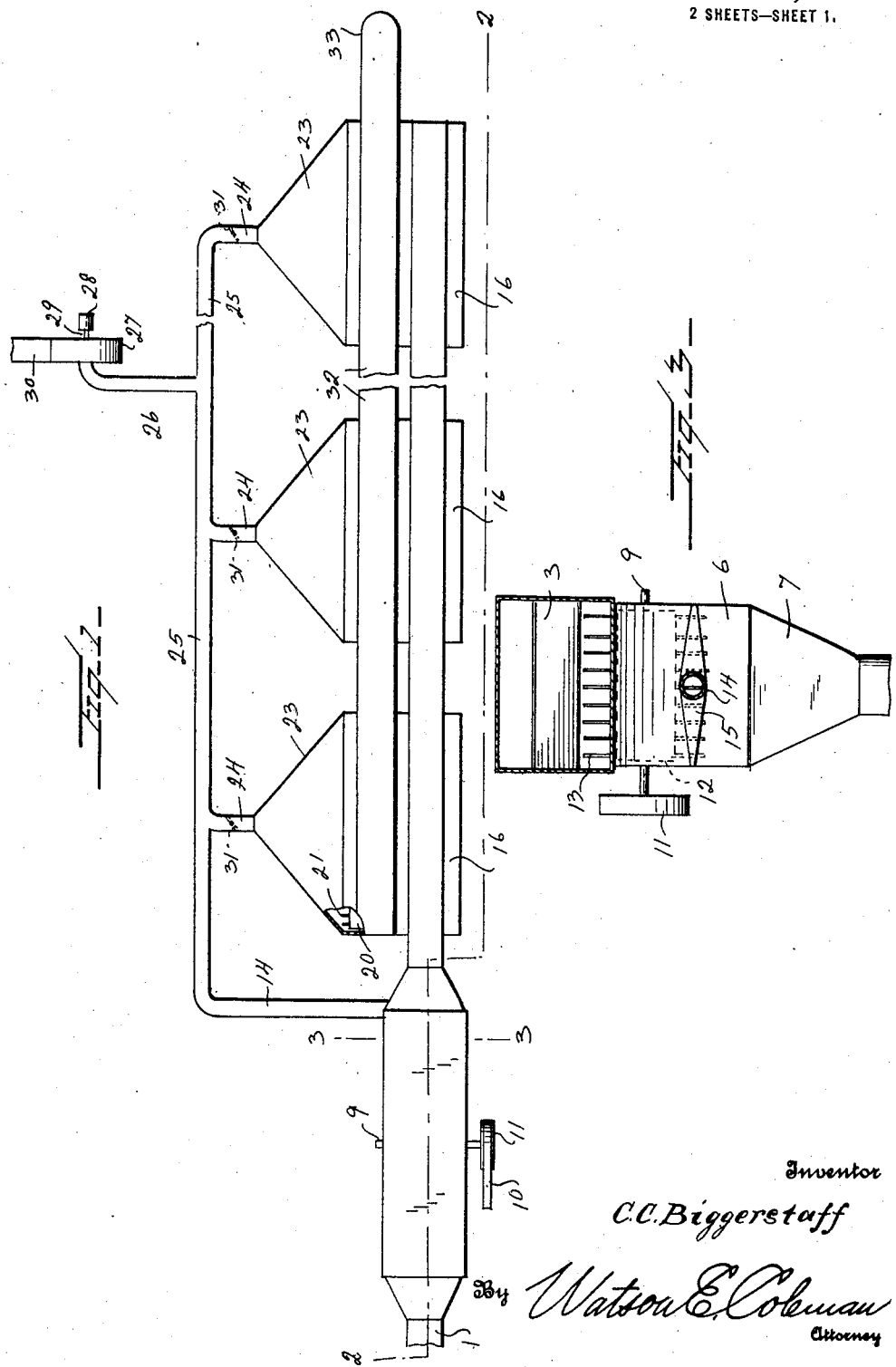

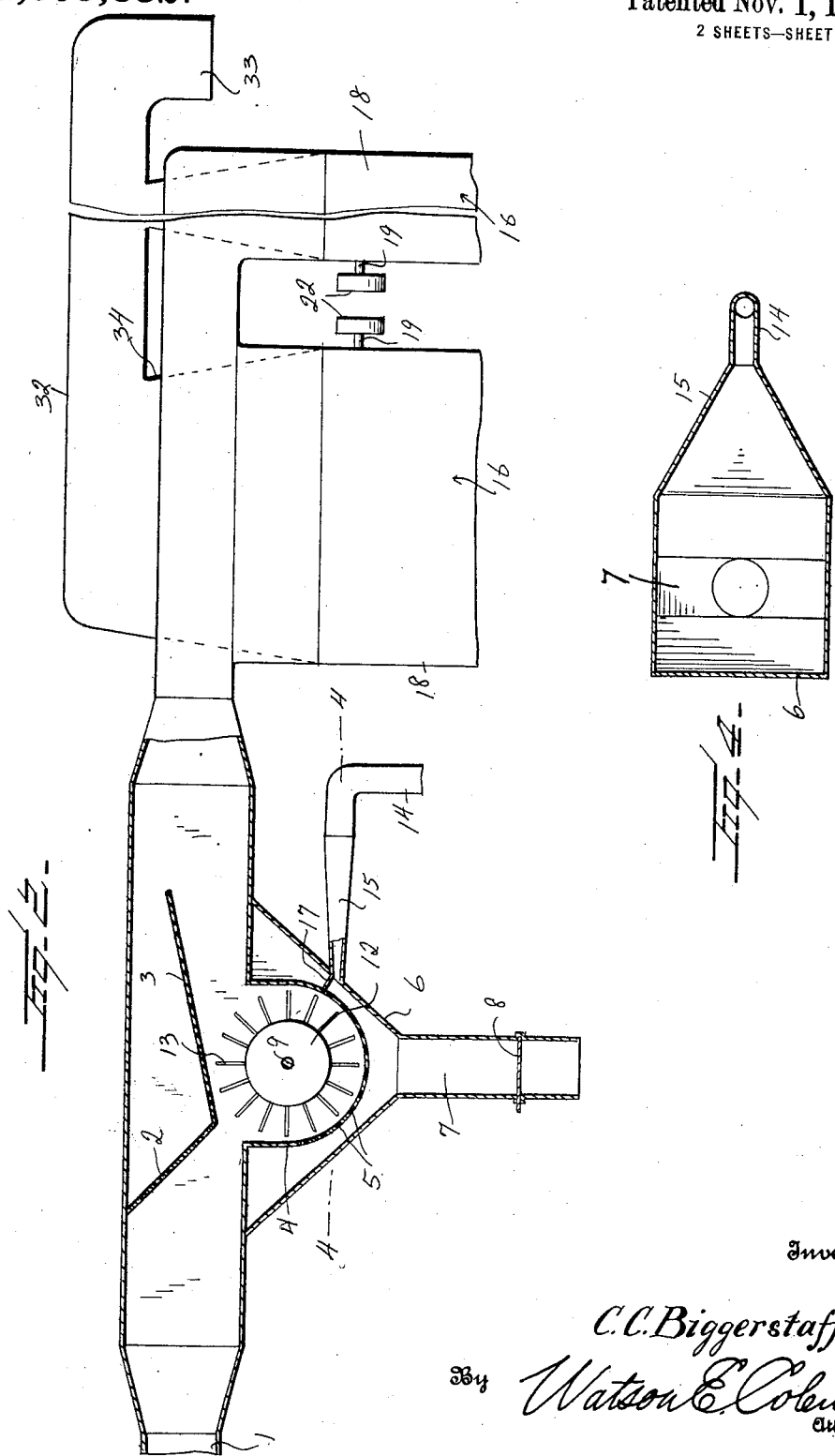

UNITED STATES PATENT OFFICE.

CHARLES C. BIGGERSTAFF, OF ROWESVILLE, SOUTH CAROLINA.

SEED-COTTON CLEANER.

1,395,382.  Specification of Letters Patent.  Patented Nov. 1, 1921.

Application filed May 22, 1920. Serial No. 383,467.

*To all whom it may concern:*

Be it known that I, CHARLES C. BIGGERSTAFF, a citizen of the United States, residing at Rowesville, in the county of Orangeburg and State of South Carolina, have invented certain new and useful Improvements in Seed-Cotton Cleaners, of which the following is a specification, reference being had to the accompanying drawings.

This invention relates to an improved seed cotton cleaner, and as a primary object of the invention, it is the aim to provide a simple, efficient and practical machine of such a construction that it will remove all trash and broken leaves and dust from seed cotton before ginning.

Another object of the invention is to provide a machine of this kind, which eliminates the use of gravity for feeding the seed cotton in the machine, and instead to employ suction, and means for agitating the seed cotton, whereby the trash may be easily and very quickly removed from the cotton, in other words separated.

A further object of the invention is the provision of a cleaning machine of this kind including pneumatic suction means connected to a plurality of ginning or cleaning machines, for pneumatically separating the trash from the seed cotton, as it passes through the various machines to the gins.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a plan view of the improved seed cotton cleaning machine, constructed in accordance with the invention, Fig. 2 is a sectional view on line 2—2 of Fig. 1, showing a plurality of cleaning or ginning machines in elevation, and the beater drum in section, Fig. 3 is a sectional view on line 3—3 of Fig. 1, and Fig. 4 is a sectional view on line 4—4 of Fig. 2.

Referring more especially to the drawings, 1 designates a conduit, in which a pneumatic suction is created, for drawing the seed cotton into the conduit. Arranged in the conduit is a perforated baffle plate 2. This baffle plate 2 is inclined as shown and has a perforated extension 3, which is inclined relatively to the upper and lower diametrically opposite portions of the conduit, and arranged at an obtuse angle to the baffle plate 2. The lower part of the conduit is provided with a drop wall 4, which is substantially circular. This wall 4 is provided with perforations 5. A conical chute 6 merges downwardly from the conduit 1, and terminates in a cylindrical extension 7 provided with a valve gate 8. Mounted in bearings of the sides of the conical chute is a shaft 9, to which power from any suitable source may be transmitted thereto by means of the belt 10 passing over the pulley 11.

Rotatable with the shaft 9 is a cylinder 12 provided with radial spikes 13. A trash receiving conduit or pipe 14 is provided, and has a flared end portion 15, which is integrally connected to the wall of the conical or tapered chute 6. The seed cotton is drawn into the conduit 1 and is forced against the baffle plate 2, breaking the seed and knocking loose a large amount of trash and dust. The cotton is held close to and in coöperation with the spikes 13 of the cylinder 12 by means of the inclined extension 3 of the baffle 2, thereby thoroughly agitating the cotton, so that the trash and dirt will loosen therefrom.

Just over this point there is created an independent suction through the pipe 14 and nozzle 15, so as to carry off all the dust and dirt which is loosened from the cotton by the action of the spikes on the cylinder. The trash and dirt pass through the perforations 5 of the drop wall 4 and are then drawn into the conduit 14. The cotton is drawn into and through the conduit 1 to the ginning or cleaning machines 16. Such cotton which may pass around the spiked cylinder 12 is thrown up against the extension plate 3 and back into the main current of air, and together with the cotton which has passed the baffle plate 2, then passes on to the gins in the usual manner. A sack or bag or other receptacle is designed to be connected to the lower end of the extension 7, for the reception of the rocks or gravel (which are too heavy to be handled by the pneumatic suction) when the gate valve 8 is opened. The flared end 15 connects to the conical chute 6, and the suction from the pipe 14 draws the trash, dirt and dust into the conduit or pipe 14.

The conduit 1 beyond that portion which carries the chute 6 is communicatively connected to the casings of the ginning or cleaning machines 16, so as to carry the cotton and the trash that passes through the perforations of the baffle plate 2 into said machines. Journaled in bearings of the ends of the casings 18 of the machines 16 are shafts 19 carrying cylinders 20, which are also supplied with radial spikes 21, acting to agitate the seed cotton, so that any trash or dust still remaining in the seed cotton will be removed through the medium of the pneumatic suction.

These cylinders 20 may be rotated in any suitable manner (not shown). However, the shafts 19 of the cylinders 20 have adjacent pulleys 22, to which belts (not shown) are connected, for driving the shafts and the cylinders. The casings 18 of the cleaning machines 16 are provided with conical chutes 23, which terminate in reduced extensions 24. The extensions 24 are in turn connected to the extended part 25 of the conduit or pipe 14, so that the trash and dust that are drawn pneumatically from the seed cotton as it is agitated in the machines 16, may pass on to the lateral extension 26. This lateral extension 26 is connected to a conventional form of suction fan 27, the pulley 28 of the shaft 29 of which may be operated in any suitable manner, for creating a pneumatic suction in the extension 26, and conduit 25.

The pneumatic or suction fan 27 has an outlet or discharge pipe 30, whereby the dust, dirt and trash may be carried to the outside of the building. In other words, this discharge pipe 30 may extend to any suitable location or beyond the wall of the building, so that the trash may be discharged. The extensions 24 are provided with gate valves 31, so as to regulate the suction draft that may be created in the cleaners or machines 16. A conduit or pipe 32 has connections with the casings of the machines 16, so that after the cotton has been thoroughly agitated and cleaned, may be drawn into said conduit or pipe 32 and discharged as at 33. The conduit or pipe 33 is connected to the casings 18 of the machine 16 by the conical connections 34, shown clearly in Fig. 3 of the drawings. Though the cleaner is shown as being applied to three gins, it is obvious that it may be applied to a system comprising any number of gins.

The invention having been set forth, what is claimed as new and useful is:—

1. In a device as set forth, the combination with a conduit having means connected thereto for creating a pneumatic suction therein, of a baffle device having perforations located in the conduit adjacent its inlet end, said baffle plate having an extension plate arranged at an inclination relative to the longitudinal plane of the conduit, to retain the trash and dust that may pass through the perforations of the baffle, means below the extension plate radially in line with the baffle for agitating the seed cotton after being deflected and initially broken by the baffle.

2. In a device as set forth, the combination with a conduit having means connected thereto for creating a pneumatic suction therein, of a baffle device having perforations located in the conduit adjacent its inlet end, said baffle plate having an extension plate arranged at an inclination relative to the longitudinal plane of the conduit, to retain the trash and dust that may pass through the perforations of the baffle, means below the extension plate radially in line with the baffle for agitating the seed cotton after being deflected and initially broken by the baffle, a chute carried by the conduit adjacent said means, and pneumatic suction means connected to the chute for drawing off the trash and dust therefrom.

3. In a device as set forth, the combination with a conduit having means connected thereto for creating a pneumatic suction therein, of a baffle device having perforations located in the conduit adjacent its inlet end, said baffle device having an extension plate arranged at an inclination relative to the longitudinal plane of the conduit, to retain the trash and dust that may pass through the perforations of the baffle, means below the extension plate radially in line with the baffle for agitating the seed cotton after being deflected and initially broken by the baffle, a chute carried by the conduit adjacent said means, and pneumatic suction means connected to the chute for drawing off the trash and dust therefrom, means arranged in the chute adjacent where said pneumatic means is connected thereto, for deflecting the trash and dust into said pneumatic means.

4. In a device as set forth, the combination with a conduit having means connected thereto for creating a pneumatic suction therein, of a baffle having perforations located in the conduit adjacent its inlet end, said baffle plate having an extension plate arranged at an inclination relative to the longtudinal plane of the conduit, to retain the trash and dust that may pass through the perforations of the baffle, means below the extension plate radially in line with the baffle for agitating the seed cotton after being deflected and initially broken by the baffle, a chute carried by the conduit adjacent said means, pneumatic suction means connected to the chute for drawing off the trash and dust therefrom, means arranged in the chute adjacent where said pneumatic means is connected thereto, for drawing the trash and dust into said pneumatic means, said chute having an extension to which a receptacle may be connected for receiving rocks and gravel, said extension having a valve, for controlling the discharge of the rocks and gravel into the receptacle.

5. In a machine as set forth, the combination with a conduit having means connected thereto for creating a pneumatic suction in the conduit, of an inclined baffle mounted in said conduit having perforations, said baffle having an extension plate inclined relatively to the longitudinal plane of the conduit, to retain the trash and dust which may sieve or pass through the perforations of the baffle, said conduit having a partially circular drop perforated wall, a seed cotton agitating device mounted in said drop wall, a chute adjacent the drop wall and having an extension, pneumatic means communicatively connected to the chute for drawing off the trash and dust, which pass through the perforations of the drop wall, said agitating means being arranged whereby the baffle extends radially therefrom, so that the seed cotton may be deflected direct to the breaking or cracking means.

6. In a machine as set forth, the combination with a conduit having means connected thereto for creating a pneumatic suction in the conduit, of an inclined baffle mounted in said conduit having perforations, said baffle having an extension plate inclined relatively to the longitudinal plane of the conduit, to retain the trash and dust which may sieve or pass through the perforations of the baffle, said conduit having a partially circular drop perforated wall, a seed cotton agitating device mounted in said drop wall, a chute adjacent the drop wall and having an extension, pneumatic means communicatively connected to the chute for drawing off the trash and dust which pass through the perforations of the drop wall, said agitating means being arranged whereby the baffle extends radially therefrom, so that the seed cotton may be deflected direct to the agitating means, and a deflector arranged in the chute adjacent where the pneumatic means connects thereto, so as to deflect the trash and dust into said pneumatic means.

In testimony whereof I hereunto affix my signature.

CHARLES C. BIGGERSTAFF.